Patented Mar. 21, 1933

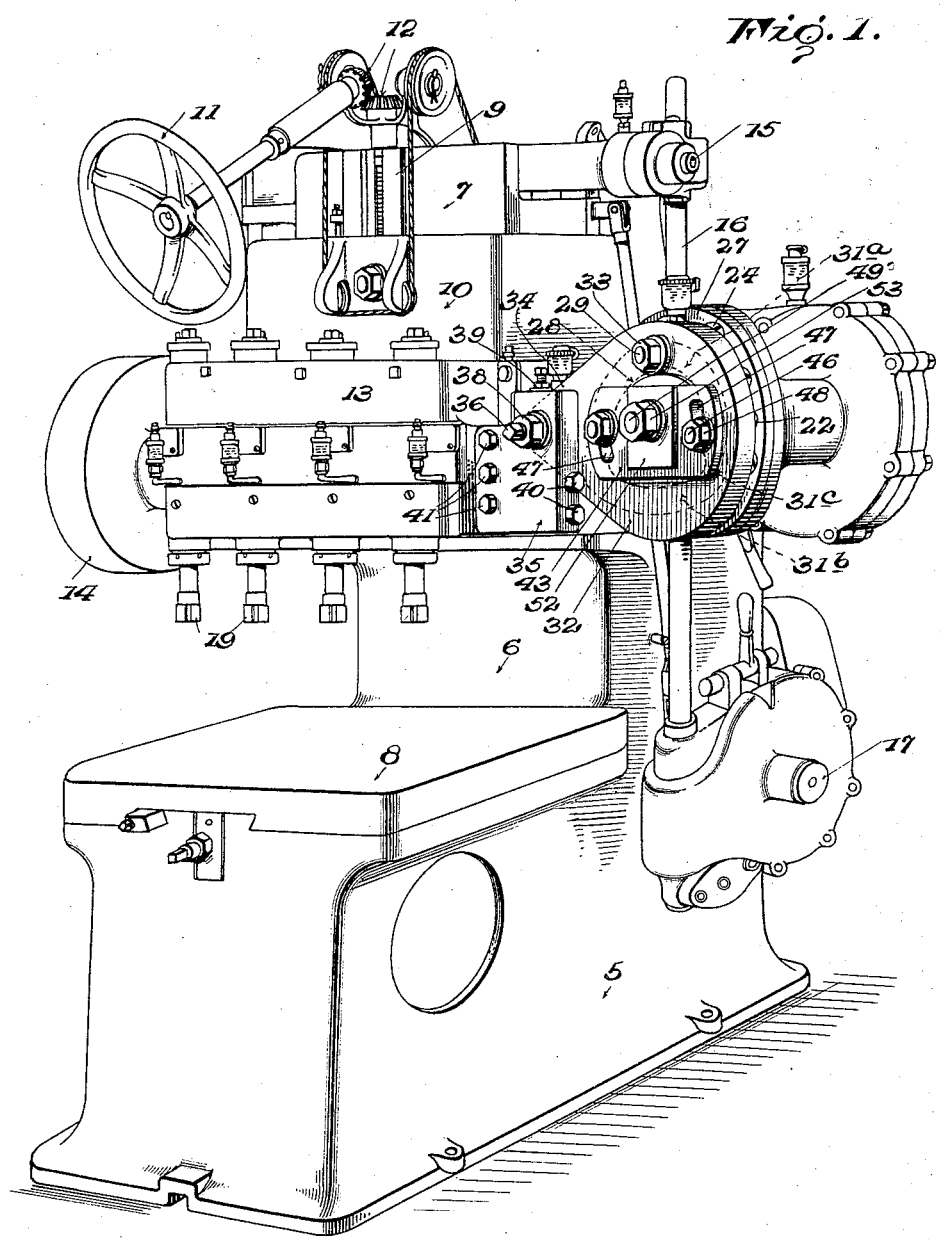

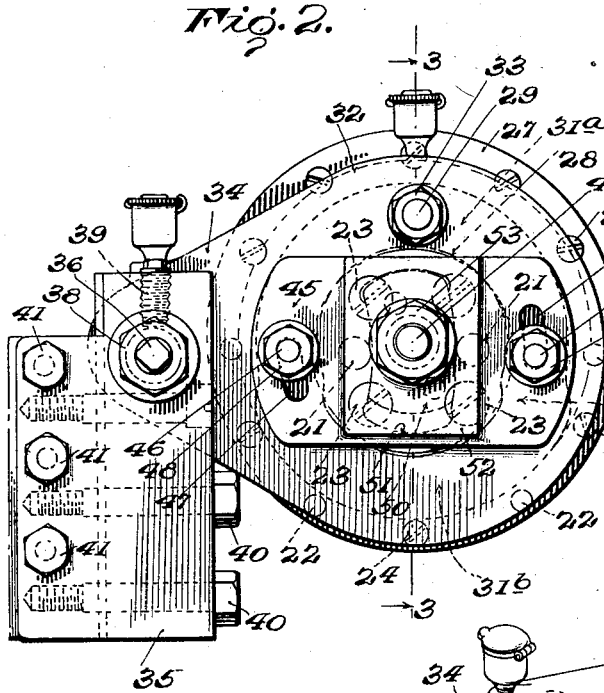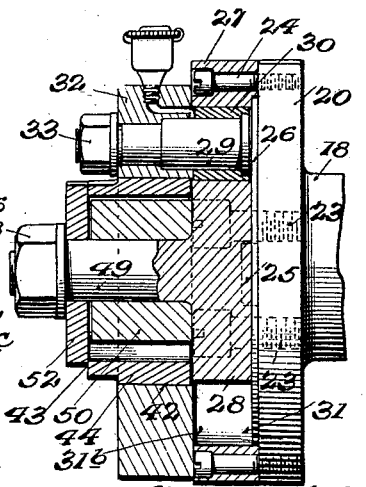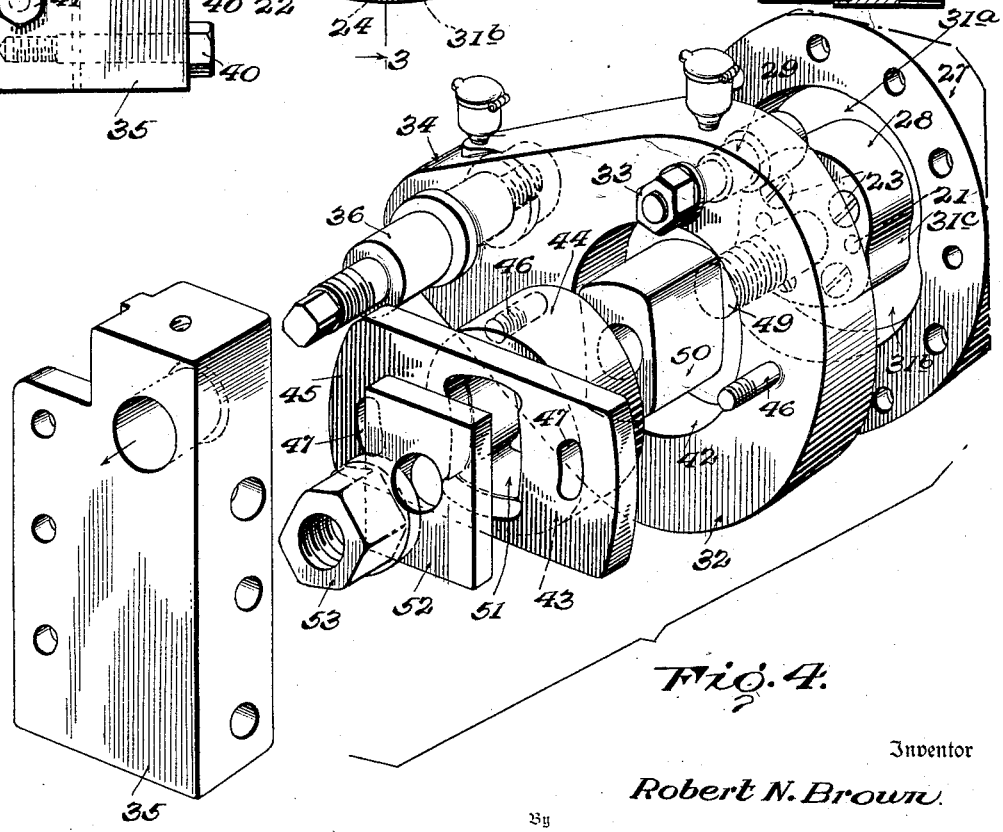

1,902,012

UNITED STATES PATENT OFFICE

ROBERT N. BROWN, OF DETROIT, MICHIGAN, ASSIGNOR TO PACKARD MOTOR CAR COMPANY, OF DETROIT, MICHIGAN, A CORPORATION OF MICHIGAN

MACHINE TOOL

Application filed May 3, 1928. Serial No. 274,863.

This invention relates to machine tools, and while capable of general use is particularly adapted for machining the compression recesses in cylinder heads for internal combustion engines.

One known method of forming such recesses comprises two machining operations, first, an initial cut with revolving rose headed cutters, of straight channels in the cylinder head forming the major portion of the recesses, and then a profiling operation to form out the recesses to the desired contour.

For the first cutting operation, cutters having diameters equal to the desired width of the channel to be cut are caused to reciprocate rectilinearly across the work to form the channels, but it has been found that after the cutters have worn appreciably, and have been reground, their diameters are somewhat reduced so that he channels cut thereby are not of the desired width.

The present invention relates to said first cutting operation, and has for an object the provision of means for securing a uniform width of the channel in spite of variations in the diameters of the cutters due to wear and resharpening thereof, or from any other cause.

Another object of the invention is the provision of means whereby the cutters may be shifted laterally when in use in order to vary the width of the channel cut thereby.

Another object is the provision of adjustable means for automatically shifting the cutters laterally in opposite directions between each working stroke of the machine in order to govern the width of the channel while maintaining the median line thereof unchanged.

Other objects and advantages of the invention will become apparent to those skilled in the art through the following description taken in connection with the accompanying drawings which illustrate one embodiment of the invention.

In the drawings:—

Fig. 1 is a perspective view of a head doming machine embodying the structure of the present invention;

Fig. 2 is a front elevation of the operating mechanism for the cutter wear compensator;

Fig. 3 is a vertical sectional view thereof substantially on the line 3—3 of Fig. 2; and Fig. 4 is a disassembled perspective view of the same.

Referring first to Fig. 1 of the drawings, 5 indicates the base of a head doming machine having a vertical column 6 at the rear thereof. A head 7 extends forwardly from the upper portion of the column 6 and overhangs a reciprocating work-holding table 8. The head 7 is provided with suitable vertical guides 9 on which a tool holder slide 10 is adapted to move, the latter being suitably counterbalanced, and operated by a hand wheel 11 through any suitable gearing indicated generaly at 12 to raise and lower a tool holder 13. The slide 10 is provided with similar horizontal guide-ways on which the tool holder 13 is adapted to slide laterally under the control of the cutter wear compensator mechanism which is about to be described.

Numeral 14 indicates the main driving pulley of the machine, which may be driven from an electric motor or from any other usual or preferred source of power. A crossshaft 15 is geared to the power pulley 14 in any suitable manner, and is in turn geared to a vertical shaft 16. Shaft 16 is operatively connected to a horizontal shaft 17 which reciprocates the work table 8 in a horizontal plane and in a direction perpendicular to said shaft, and to a horizontal shaft 18 (Fig. 3) which operates the wear compensating means. The driving pulley 14 is also connected to the milling tools 19 in any suitable manner so that these tools may be constantly rotated while being moved vertically by means of the feeding mechanism operated by the hand wheel 11, and while being shifted laterally by the wear compensating means forming the particular subject matter of the present invention.

Referring now to Figs. 2, 3 and 4 of the drawings, it will be seen that the shaft 18 terminates at its forward end in a flange 20 which is suitably drilled and tapped to accommodate fastening means such as dowels 21 and 22, and cap screws 23 and 24, and is also provided with concentric shoulders 25 and 26. An outer cam member 27 is mounted on the flange 20, being centered thereon by means of the shoulder 26 and being retained in position by suitable means such as the dowels 22 and cap screws 24. An inner cam member 28 is also mounted against the flange 20, being centered thereon by the shoulder 25 and retained in position by suitable means such as the screws 23 and dowels 21. The annular space between the cam members 27 and 28 forms a cam groove 31 composed of two concentric arcuate portions 31$^a$ and 31$^b$ disposed at different radial distances from the axis of the shaft 18 and connected by short inclined portions 31$^c$. A pin 29 having an anti-friction roller 30 is adapted to fit within the cam groove and is fixed in a link member 32 in any preferred manner as by means of the nut 33. The link member 32 is adapted to rest loosely against the face of the cam member 27, and is provided with a tapered extension 34 which is pivoted to a connecting means such as a block 35 by suitable means such as a pin 36 journaled in said extension 34 and fixed to the connecting block by means such as a nut 38 and set screw 39. The connecting block 35 is rigidly fixed to the tool holder 13 as by means of cap screws 40 and 41 so that lateral motion of the link in either direction will be communicated to the tool holder to adjust the tools as a unit with respect to the work.

The large end of the link 32 is provided directly beneath the pin 29 with a circular opening 42, and an adjusting member 43 is provided having a cylindrical extension 44 journaled within the opening 42 and also having a flange 45 adapted to overlie the link member 32. Fastening means such as studs 46 are fixed in the link member 32 and project through arcuate openings 47 in the flange 45 of the adjusting member and are provided with nuts 48, whereby the adjusting member may be adjusted circumferentially with respect to the link 32 and held in adjusted position.

The inner cam member 28 has an extension in the form of a shaft 49 coaxial with the shaft 18. Journaled on shaft 49 is an arcuate wearing block 50 which is adapted to slide in an elongated arcuate opening or slot 51 in the adjusting member 43. A plate 52 is mounted on the outer end of shaft 49 and bears against the outer face of adjusting member 43, the whole being held in assembled relation by means of the nut 53 threaded on shaft 49.

The radius of curvature of the block 50 and the slot 51 is the same as the effective length of the link member 32, or in other words, is the normal distance between the axis of shaft 18 and the axis of the pivot pin 36. Slot 51 is longer than block 50, the difference in length being substantially equal to the throw given to link 32 due to the difference in length of the radii of cam groove portions 31$^a$ and 31$^b$. It will thus be seen that when the adjusting member 43 is so positioned that the arcuate surfaces of the opening 51 and the block 50 are concentric with the axis of pin 36, any vertical movement of the large end of the link member 32 caused by the action of the cam members 27 and 28 upon the pin 29, will merely swing the link member 32 about the pivot 36 without causing any lateral movement of the tool carrier 13. However, if the adjusting member 43 is positioned so that the curved surfaces are not concentric with the axis of pin 36, vertical motion of the large end of the link member 32 under the action of the cam members 27 and 28 will cause a lateral motion of the link member which will be communicated to the tool carrier 13, the amplitude of such motion being dependent upon the circumferential adjustment of the member 43 from its normal position.

In operation the cylinder head casting to be milled out is suitably fixed on the reciprocating table or work carrier 8, the machine is started, and the milling cutters are lowered into contact with the work by means of the hand wheel 11, whereupon the reciprocation of table 8 will cause the cutters to form channels in the work. When it is found that by reason of wear or resharpening the cutters 19 are reduced in diameter so that the channels cut thereby in the work are not of the requisite width, the operator loosens the nuts 48 and 53, and, block 50 being at one end or the other of slot 51, rotates the adjusting member 43 slightly within the link 32 so that the curved surfaces of opening 51 are no longer concentric with the axis of the pivot 36. Since the opening 42 is eccentric to shaft 49 due to the action of pin 29 in cam groove 31, and since block 50, which is housed in slot 51 of adjusting member 43 and hence non-rotatable relative thereto, is journaled on shaft 49, this rotation of the adjusting member must be about shaft 49 as a center and, due to concentricity of openings 47 and 42, results in moving the link 32 and tool holder 13 laterally to the line of cut. This adjustment is continued till the sides of the cutters are properly positioned to mill out one side of the channels. The nuts 48 and 53 are then tightened to hold this adjustment. When the machine is again put in operation, the up and down motion of the large end of link member 32 will now be accompanied by a lateral reciprocation of the link member caused by the camming action of shaft 49 and block 50 within the curved opening 51 of the adjusting member, this reciprocating motion depending upon the extent of the adjustment of said member 43.

The gearing connecting the driving pulley 14 with the shaft 17 and 18 is so timed and arranged that the pin 29 of the link member passes from one cam surface of the cam groove to the other at the instant that the work table 8 is at the end of its working stroke. It will thus be seen that the cutters 19 enter the work after being shifted slightly to one side of their normal central position, execute a straight cutting movement through the work, are then shifted laterally in the opposite direction for an equal distance from their central position, and then execute a return straight cutting movement through the work. By this arrangement the cutters are enabled to form a straight sided groove in the work, the width of which is adjustable to compensate for differences in diameter of the cutters, without displacing the median line of the groove.

While one embodiment of the invention has been illustrated and described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts without departing from the spirit of the invention. Reference will therefore be had to the appended claims for a definition of the limits of the invention.

What is claimed is:

1. In a device of the class described, a rotatable cam member of fixed contour, a slide, a link pivoted to the slide at one end and provided with means at its other end engaging the cam whereby a constant rotation of the cam will intermittently swing the link about its pivot, and means comprising a slotted member carried by said link and a block member coaxial with said cam and housed within said slotted member for converting said intermittent swinging of said link about its pivot into intermittent reciprocation of said link and slide.

2. In a device of the class described, a rotatable cam member of fixed contour, a slide, a link pivoted to the slide at one end and provided with means at its other end engaging the cam whereby a constant rotation of the cam will intermittently swing the link about its pivot, and means comprising a slotted member carried by said link and a block member coaxial with said cam and housed within said slotted member for converting said intermittent swinging of said link about its pivot into intermittent reciprocation of said link and slide, said means being adjustable to vary the amount of translation from zero to a maximum.

3. In a device of the class described, a rotatable cam member of fixed contour, a slide, a link pivoted to the slide at one end and provided with means at its other end engaging the cam whereby a constant rotation of the cam will intermittently swing the link about its pivot, a stud shaft carried by said cam member adjacent the swinging end of the link, a block journaled on said shaft, said link having a slot therein adapted to cooperate with the block to convert the intermittent swinging of the link into lateral translation of the slide.

4. In a device of the class described, a rotatable cam member of fixed contour, a slide, a link pivoted to the slide at one end and provided with means at its other end engaging the cam whereby a constant rotation of the cam will intermittently swing the link about its pivot, a stud shaft carried by said cam member adjacent the swinging end of the link, a block journaled on said shaft, and an adjustable member carried by the link having a slot therein adapted to cooperate with the block to convert the intermittent swinging of the link into lateral translation of the slide.

5. In a device of the class described, a rotatable cam member of fixed contour, a slide, a link pivoted to the slide at one end and provided with means at its other end engaging the cam whereby a constant rotation of the cam will intermittently swing the link about its pivot, a stud shaft carried by said cam member adjacent the swinging end of the link, a block journaled on said shaft, and a member carried by the link having a slot therein adapted to cooperate with the block, said slot being curved and the member being so adjustable that swinging of the link will cause a lateral translation of the slide which may be varied from zero to a maximum.

6. In a device of the class described, the combination of a revolving cutter, a work carrier reciprocable with respect to the cutter, means feeding the cutter toward the work, and cam operated means moving the cutter laterally to its line of cut and in opposite directions at each reversal of the reciprocating movement.

7. In a device of the class described, the combination of a cutter, a work carrier reciprocable in a straight line with relation to the cutter, means for feeding the cutter into the work, whereby a straight sided channel is formed in the work, and adjustable means traversing the cutter laterally to its line of cut and in opposite directions at each reversal of the reciprocating movement of the carrier and maintaining it in shifted position during the ensuing cutting stroke.

8. In a device of the class described, the combination of a cutter and a work carrier, with means reciprocating one of said elements with relation to the other, means feeding the cutter into the work, and cam means traversing the cutter laterally to its line of cut at the end of each alternate reciprocating stroke, said cam means being symmetrically formed whereby the successive lateral traverses of said cutter are equal and in opposite directions, and manually adjustable means for varying the amount of lateral traverse produced thereby.

9. In a device of the class described, the combination of a cutter and a work carrier, with means reciprocating one of said elements with relation to the other to cut a channel in the work, a cam member rotating in synchronism with the reciprocating means, and connections between one of said elements and the cam for shifting the said last named element laterally to the line of cut at each reversal of the reciprocating movement.

10. In a device of the class described, the combination of a revolving cutter and a work carrier with means for reciprocating one of said elements with relation to the other, a carrier for the cutting tool, a cam member rotating in synchronism with the reciprocating means, a link pivoted to the cutter carrier and having a pin cooperating with the cam to swing the link about its pivot, a stud mounted on the axis of the cam, and an angularly adjusted plate mounted on the link and having a slot cooperating with said stud for the purpose of converting the swinging of the link into lateral translation of the cutter carrier relative to the work carrier.

11. In a device of the class described, the combination of a revolving cutter and a work carrier, with means for reciprocating one of said elements with relation to the other, a carrier for the cutter, a cam member rotating in synchronism with the reciprocating means, a link hinged to the tool carrier on a pivot parallel to the axis of the cam and having a pin cooperating with the cam to swing the link about its pivot, a stud mounted on the axis of the cam, and an angularly adjustable plate mounted on the link and having a curved slot cooperating with said stud, the radius of the curvature of the slot being equal to the distance between the axes of the pivot and stud for the purpose of converting the swinging of the link into lateral translation of the tool carrier relative to the work carrier.

12. In a device of the class described, a rotatable cam member of fixed contour, a slide, a link connected to the slide at one end and engaging the cam at the other, the contour of said cam being such that constant rotation thereof will intermittently swing the link about its point of connection to said slide, and means in addition to said cam for positively constraining the movement of the swinging end of said link to a predetermined path whereby a portion of said intermittent swinging movement may be converted into intermittent bodily translation of said link and slide, said means being adjustable to vary the bodily translation of the slide from zero to a maximum.

13. In a device of the class described, the combination of a cutter and a work carrier, one of said elements being reciprocable with relation to the other to form a channel in the work, a cam continuously rotating in synchronism with the reciprocable element, and means for converting the continuous rotation of said cam into intermittent movement of one of said elements laterally to the line of cut and in opposite directions at each reversal of the reciprocating movement, whereby the width of the channel formed may be regulated.

14. In a device of the class described, the combination of a cutter and a work carrier, one of said elements being reciprocable with relation to the other to cut a channel in the work, and means traversing the cutter laterally to its line of cut equally and in opposite directions at each reversal of the reciprocating movement, said means being adjustable to vary the amount of the traverse whereby the width of the channel cut may be maintained constant irrespective of wear of the cutter.

In testimony whereof I have signed this specification.

ROBERT N. BROWN.